United States Patent
Seo et al.

(10) Patent No.: US 7,077,686 B2
(45) Date of Patent: Jul. 18, 2006

(54) FASTENING APPARATUS FOR A PLUGGABLE OPTICAL TRANSCEIVER MODULE

(75) Inventors: Ja-Won Seo, Suwon-si (KR); Yong-Gu Lee, Bucheon-si (KR); Joo-Chul Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/919,737

(22) Filed: Aug. 17, 2004

(65) Prior Publication Data

US 2005/0260880 A1    Nov. 24, 2005

(30) Foreign Application Priority Data

May 21, 2004   (KR)  ..................... 10-2004-0036226

(51) Int. Cl.
*H01R 13/62*   (2006.01)
(52) U.S. Cl. .................................................... 439/372
(58) Field of Classification Search ................ 439/352, 439/358, 357, 372, 733; 361/752; 385/76, 385/88
See application file for complete search history.

(56) References Cited

U.S. PATENT DOCUMENTS

| | | | | |
|---|---|---|---|---|
| 4,341,428 A * | 7/1982 | Hatch et al. ................. | 439/372 |
| 4,721,358 A * | 1/1988 | Faber et al. ................... | 385/56 |
| 4,913,667 A * | 4/1990 | Muz ........................ | 439/733.1 |
| 5,037,175 A * | 8/1991 | Weber ........................... | 385/76 |
| 5,117,476 A * | 5/1992 | Yingst et al. ................. | 385/88 |
| 5,122,076 A * | 6/1992 | Pitts ............................ | 439/352 |
| 5,154,629 A * | 10/1992 | Carver et al. ............... | 439/352 |
| 5,340,329 A * | 8/1994 | Hirai ........................... | 439/357 |
| 5,713,752 A * | 2/1998 | Leong et al. ................ | 439/358 |
| 5,727,963 A * | 3/1998 | LeMaster .................... | 439/358 |
| 5,734,558 A * | 3/1998 | Poplawski et al. .......... | 361/752 |
| 5,767,999 A * | 6/1998 | Kayner ......................... | 398/164 |
| 5,901,263 A * | 5/1999 | Gaio et al. ..................... | 385/92 |
| 5,997,326 A * | 12/1999 | Koradia et al. ............. | 439/160 |
| 6,056,578 A * | 5/2000 | Lin ............................. | 439/358 |
| 6,371,788 B1* | 4/2002 | Bowling et al. ............ | 439/358 |
| 6,533,603 B1* | 3/2003 | Togami ....................... | 439/372 |
| 6,551,117 B1* | 4/2003 | Poplawski et al. ............ | 439/92 |
| 6,570,768 B1* | 5/2003 | Medina ....................... | 361/747 |
| 6,744,963 B1* | 6/2004 | Hwang ........................ | 385/139 |
| 6,816,376 B1* | 11/2004 | Bright et al. ................ | 361/704 |
| 6,824,416 B1* | 11/2004 | Di Mascio .................. | 439/352 |
| 6,851,867 B1* | 2/2005 | Pang et al. ..................... | 385/88 |
| 2003/0194899 A1* | 10/2003 | Ueda ........................... | 439/357 |
| 2004/0147149 A1* | 7/2004 | Wang ........................... | 439/145 |
| 2004/0235332 A1* | 11/2004 | Ice ............................. | 439/352 |
| 2005/0018976 A1* | 1/2005 | Lee et al. ...................... | 385/88 |

* cited by examiner

*Primary Examiner*—Ross Gushi
*Assistant Examiner*—Larisa Tsukerman
(74) *Attorney, Agent, or Firm*—Cha & Reiter, L.L.C.

(57) ABSTRACT

A fastening apparatus of a pluggable optical transceiver module, which is coupled to an optical connector and electrically connected to a cage assembly, is disclosed. The fastening apparatus includes a module case extending along a longitudinal direction and at least one rotational latch apparatus positioned on both longitudinal lateral surfaces of the module and adapted to be latched for retaining the module. When the module is mounted along the longitudinal direction of the case, it can be released through a seesawing motion about a rotation axis, which is provided in the interior thereof, while pressing in a direction perpendicular to the longitudinal direction.

18 Claims, 18 Drawing Sheets

FASTENING APPARATUS FOR A PLUGGABLE OPTICAL TRANSCEIVER MODULE

CLAIM OF PRIORITY

This application claims priority to an application entitled "fastening apparatus of pluggable optical transceiver module," filed with the Korean Intellectual Property Office on May 21, 2004 and assigned Serial No. 2004-36226, the contents of which are hereby incorporated by reference.

BACKGROUND OF THE INVENTION

1. Field of the Invention

The present invention relates to a fastening apparatus for a pluggable optical transceiver module, and more particularly to a fastening apparatus for a pluggable optical transceiver module adapted to mount and unmount the module.

2. Description of the Related Art

Optical communication systems are used to transmit information in a variety of communication networks or intelligent networks, because such systems can transmit a large quantity of information at high speed using a limited number of circuits.

Such optical communication systems use optical communication switches, which have been developed according to various standard modes, or optical communication apparatuses including optical transceiver modules, such as gigabit interface converters (GBICs), in order to connect electrical signals to input/output optical signals.

The optical transceiver module, as used herein, refers to an optical connector that houses at least a light source apparatus, a light source detection apparatus, an optical transmission circuit, and an optical reception circuit.

Such an optical transceiver module is fabricated according to various standards, which define the specification of the module, to reduce the size of the optical transmission electronic equipment.

An example of an optical transceiver module is an XFP module, i.e., 10 gigabit small form factor pluggable module. In this regard, the XFP MSA (multi-source agreement) revision 3.1 is the standard specification for XFP modules.

FIG. 1 shows the mechanical components of an XFP module 10. The function of main components of the module will now be explained briefly.

The XFP module 10 is a pluggable optical transceiver module. An optical connector 30 acts as the electrical contact portion between a host board 20 and the module. A housing-shaped module case 21 retains the XFP module 10 on the optical connector 30. A heat sink 23 radiates the heat generated by the XFP module 10. A clip 23 retains the heat sink 23 on the cage assembly 21.

FIG. 2 is a side view of the XFP module 10 and the module case 21. The XFP module 10 and the module case 21 will now be explained.

The XFP module 10 has a bail latch 11, which has a ring-shaped groove 12 formed on its end. The groove 12 is latched and retained on a latching portion 21a, which is formed on the module case 21, when the module 10 is mounted on the module case 21. During unmounting, the bail latch 11 separates the groove 12 of the module 10 from the latching portion 21a.

The latching portion 21a is positioned on both lateral surfaces of the module case 21 and is bent toward the interior thereof.

FIG. 3 is a perspective view showing the front portion of the XFP module 10, which is commercially available. The XFP module 10 includes a bail latch 11, a ring-shaped groove 12 having a slant angle, an insertion hole 13 into which an optical connector 30 is inserted, and a handle 14 for enabling forward or backward operation.

FIGS. 4 and 5 are side views of the XFP module 10 for illustrating the principle of operating the mounting and unmounting of the module 10.

As shown in FIG. 4, when the XFP module 10 is to be mounted, the handle 14 of the module 10 is grasped and rotated down from above to turn it along a downward direction. The ring-shaped groove 12 is then inserted into a U-shaped groove, which is created by the upper and lower covers of the appliance.

In this state, the XFP module 10 is mounted on the module case 21 and the groove 12 is latched on the latching portion 21a and fixedly retained thereby.

As shown in FIG. 5, when the XFP module 10 is to be unmounted, the handle 14 of the module 10 is rotated upward from below to turn it along a horizontal direction. The ring-shaped groove 12 is then moved along direction C1 (marked by an arrow in FIG. 5) away from the U-shaped groove, which is created by the upper and lower covers of the appliance.

Subsequently, the ring-shaped groove 12 is released from the latching portion 21a of the module case 21 and the latching portion 21a, which has been bent toward the interior of the module case 21, is pushed toward the exterior thereof. The module 10 is then unmounted.

In summary, the XFP module 10 adopts a fastening mechanism wherein it is mounted on and unmounted from the module case 21 using its handle 14.

However, such conventional pluggable optical transceiver modules have a problem in that, every time the module is unmounted from the module case (e.g., for experiment, for maintenance and/or for repair during service), the ring-shaped groove of the module must be released from the latching portion of the module case. This causes considerable inconvenience to users.

In particular, the pluggable optical transceiver module is provided on the module case and is fitted with the optical connector. The optical connector must be removed from the module and the handle must be positioned in the horizontal direction, in order to unmount the module. Therefore, when the module needs to be mounted and unmounted frequently, the optical connector should be repeatedly removed and inserted in an inefficient manner.

SUMMARY OF THE INVENTION

One aspect of the present invention relates to a fastening apparatus of a pluggable optical transceiver module capable of mounting and unmounting the module in a more efficient manner as compared to the conventional modules discussed above.

Another aspect of the present invention relates to a fastening apparatus of a pluggable optical transceiver module capable of mounting and unmounting the module by pressing it while an optical connector is coupled thereto.

Still another aspect of the present invention relates to a fastening apparatus of a pluggable optical transceiver module capable of mounting and unmounting the module through a sliding motion while an optical connector is coupled thereto.

One embodiment of the present invention is directed to a fastening apparatus of a pluggable optical transceiver module which is coupled to an optical connector and which is electrically connected to a cage assembly. The apparatus includes a module case extending along a longitudinal direction and at least one rotational latch apparatus positioned on both longitudinal lateral surfaces of the module and adapted to be latched for retaining the module. When the module is mounted along the longitudinal direction of the case, it can be released by applying a seesawing motion about a rotation axis, which is provided in the interior thereof, while pressing in a direction perpendicular to the longitudinal direction for unmounting the module.

Another embodiment of the present invention is directed to a fastening apparatus of a pluggable optical transceiver module which is coupled to an optical connector and is electrically connected to a cage assembly. The apparatus includes a module case extending along a longitudinal direction and at least one movable latch apparatus positioned on both longitudinal lateral surfaces of the module and adapted to be latched for retaining the module. When the module is mounted along the longitudinal direction of the case, it can be released through a sliding motion, while being pulled in the longitudinal direction, for unmounting the module.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Figure 1:
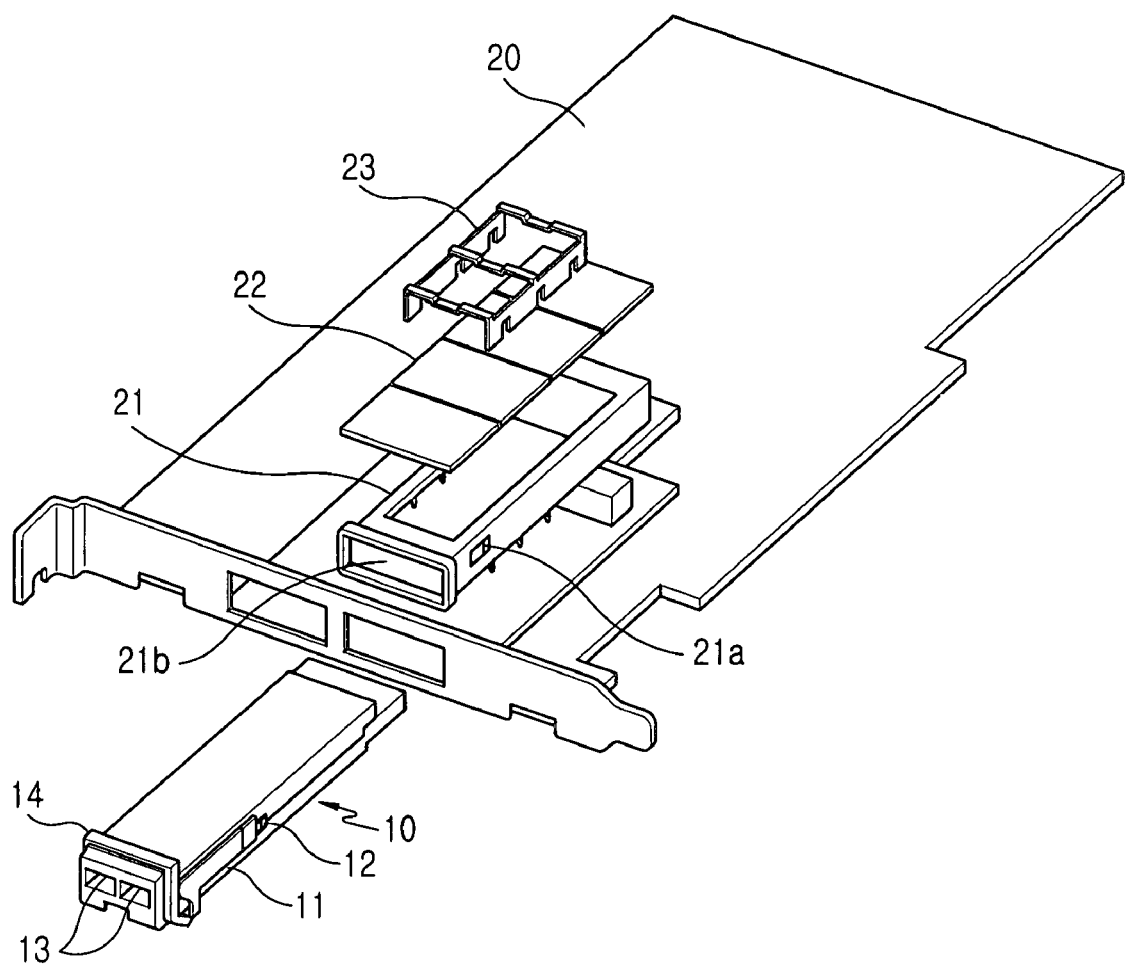
FIG. 1 is an exploded perspective view showing the construction of a conventional pluggable optical transceiver module.
Figure 2:
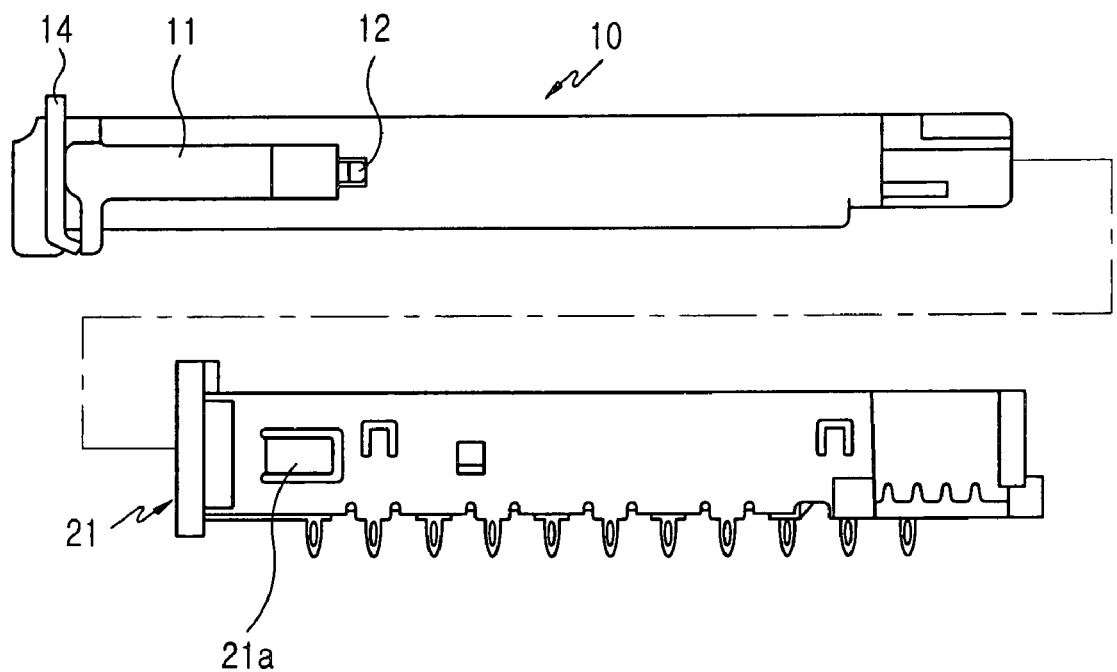
FIG. 2 is a side view showing a conventional pluggable optical transceiver module and a module case.
Figure 3:
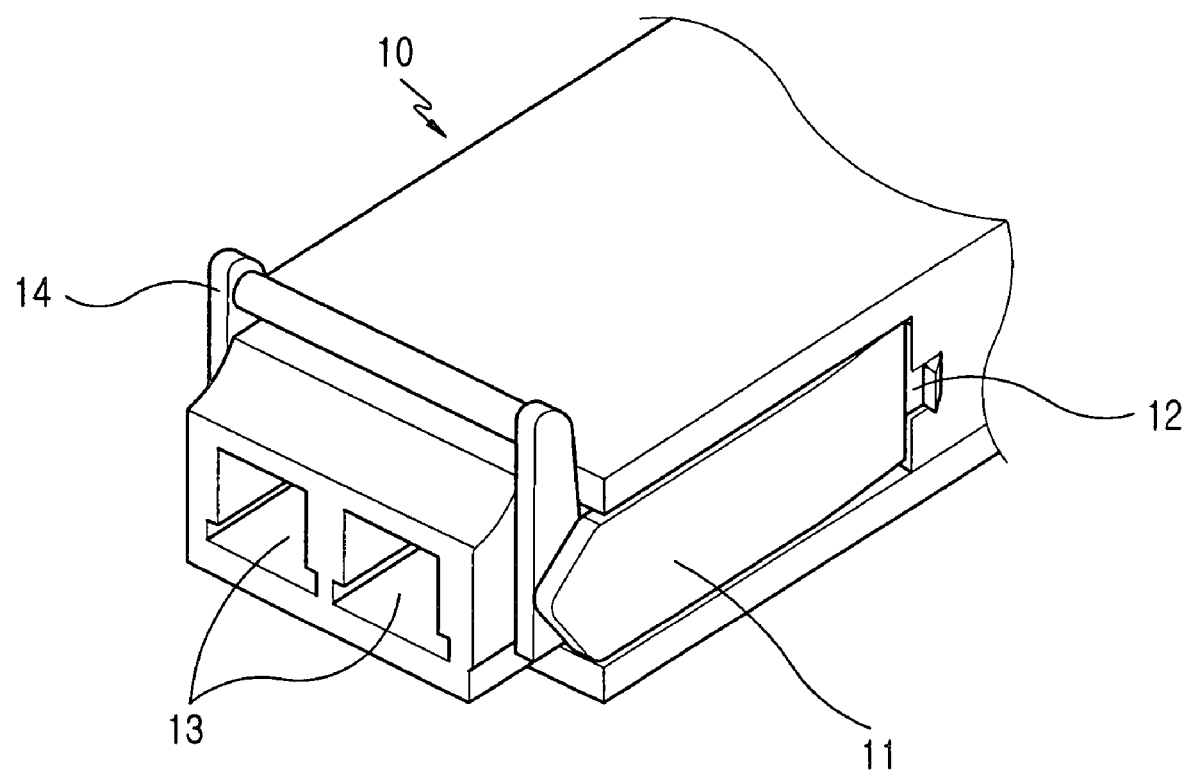
FIG. 3 is a perspective view showing a conventional pluggable optical transceiver module.
Figure 4:
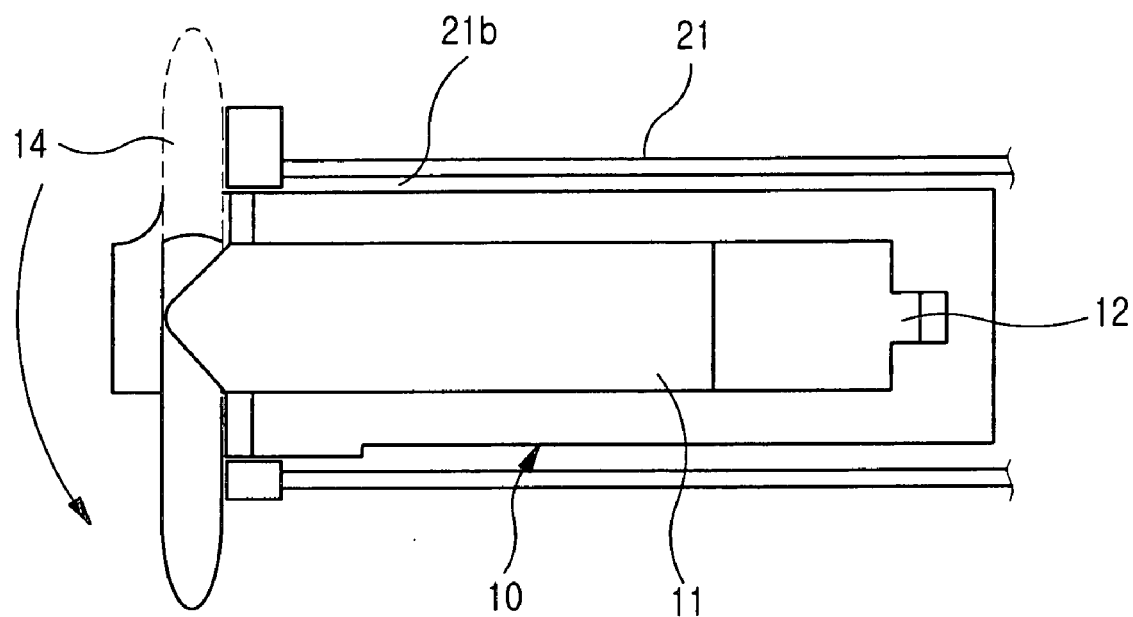
FIG. 4 is a side view showing a conventional pluggable optical transceiver module, before it is operated.
Figure 5:
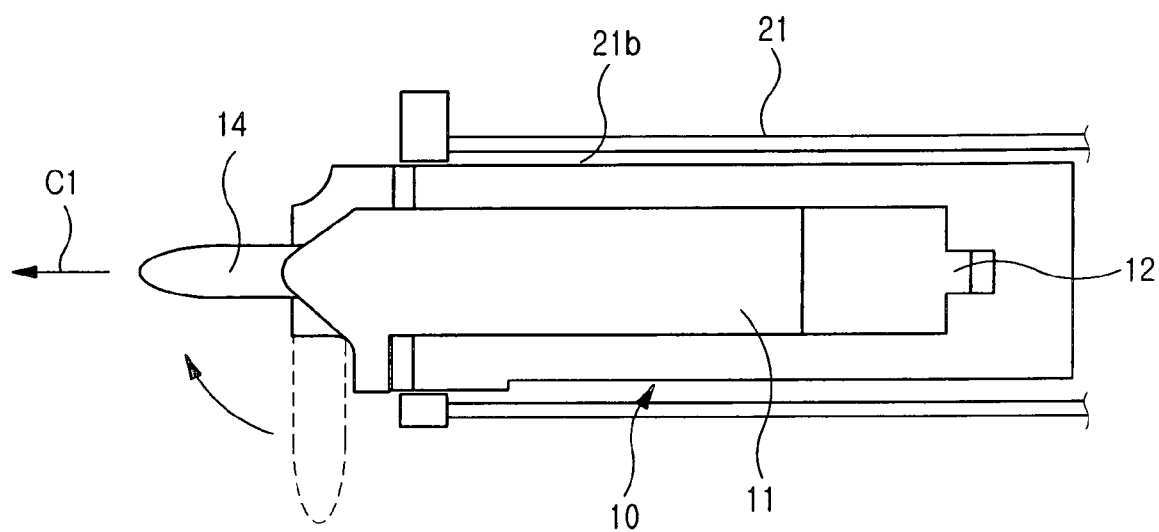
FIG. 5 is a side view showing a conventional pluggable optical transceiver module, while it is operated.
Figure 6:
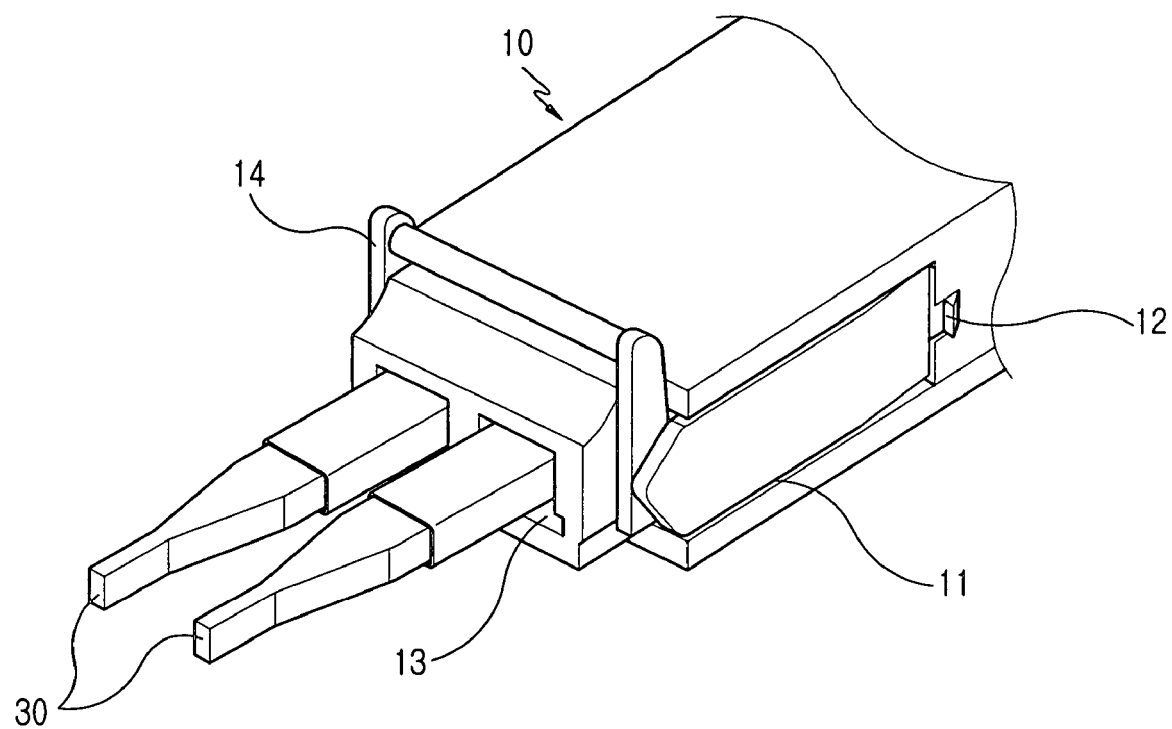
FIG. 6 is a perspective view showing a conventional pluggable optical transceiver module, which is connected to an optical connector.

As shown in FIGS. 7 to 17, a fastening apparatus 100 of a pluggable optical transceiver module includes a module case 200 and at least one rotational latch apparatus 300.

The module case 200 has at least one latching portion 201 formed on both lateral surfaces thereof so that the rotational latch apparatus 300 can be latched or released as it seesaws.

The rotational latch apparatus 300 is positioned on both longitudinal lateral surfaces of the module 10 and is adapted to be latched on the latching portion 201 for retaining the module 10. When the module 10 is mounted along the longitudinal direction of the module case 200, it can be released from the latching portion 201 by applying a seesawing motion about a rotation axis A1, which is provided in the interior thereof, while pressing in a direction perpendicular to the longitudinal direction.

The rotational latch apparatus 300 enables mounting and unmounting while the optical connector 30 and the module 10 are connected to each other.

The latching portion 201 is made of a plate spring.

The plate spring is bent at a predetermined angle toward the interior of the module case 200.

The rotational latch apparatus 300 is includes of a rotation plate 302, a push button 303, a rotation locker portion 304, and a rotation hinge portion 305.

The rotation plate 302 is positioned in an opening 301 formed on both lateral surfaces of the module 10 and is adapted to be rotated about the rotation axis A1 of the rotation hinge portion 305 and seesaw, when pressed in a direction perpendicular to the longitudinal direction.

The push button 303 is formed on an end of the rotation plate 302 and is adapted to be pressed in a direction perpendicular to the longitudinal direction of the rotation plate 302 by an external force.

The rotation locker portion 304 is formed on the other end of the rotation plate 302 and is adapted to be latched on or released from the latching portion 201, as the rotation plate 302 seesaws.

The rotation hinge portion 305 provides the rotation axis A1 and is rotatably coupled to the module 10 to allow the rotation plate 302 to seesaw.

In this embodiment, the rotation hinge portion 305 has a cylindrical shape.

The rotation plate 302 has an external surface which is slanted toward the interior of the module 10 along the longitudinal direction of the rotation plate 302.

The push button 303 has at least one guide protrusion 303a formed therein to guide the rotation plate 302 during rotation.

An elastic means 303b is positioned between each guide protrusion 303a to provide a elastic force so that the rotation plate 302 can seesaw when rotated by pressing the push button 303.

The elastic means 303b may be made of a coil spring and a soft rubber member.

The rotation plate 302 has at least one support plate 306 formed along its longitudinal direction on each of the upper and lower portions thereof to contact an engagement step 309, which is formed in the opening 301 of the module 10, and support the rotation plate 302.

The operation of the fastening apparatus of a pluggable optical transceiver module according to a first preferred embodiment of the present invention, configured as above, will now be described in more detail with reference to FIGS. 7 to 12.

Figure 7:
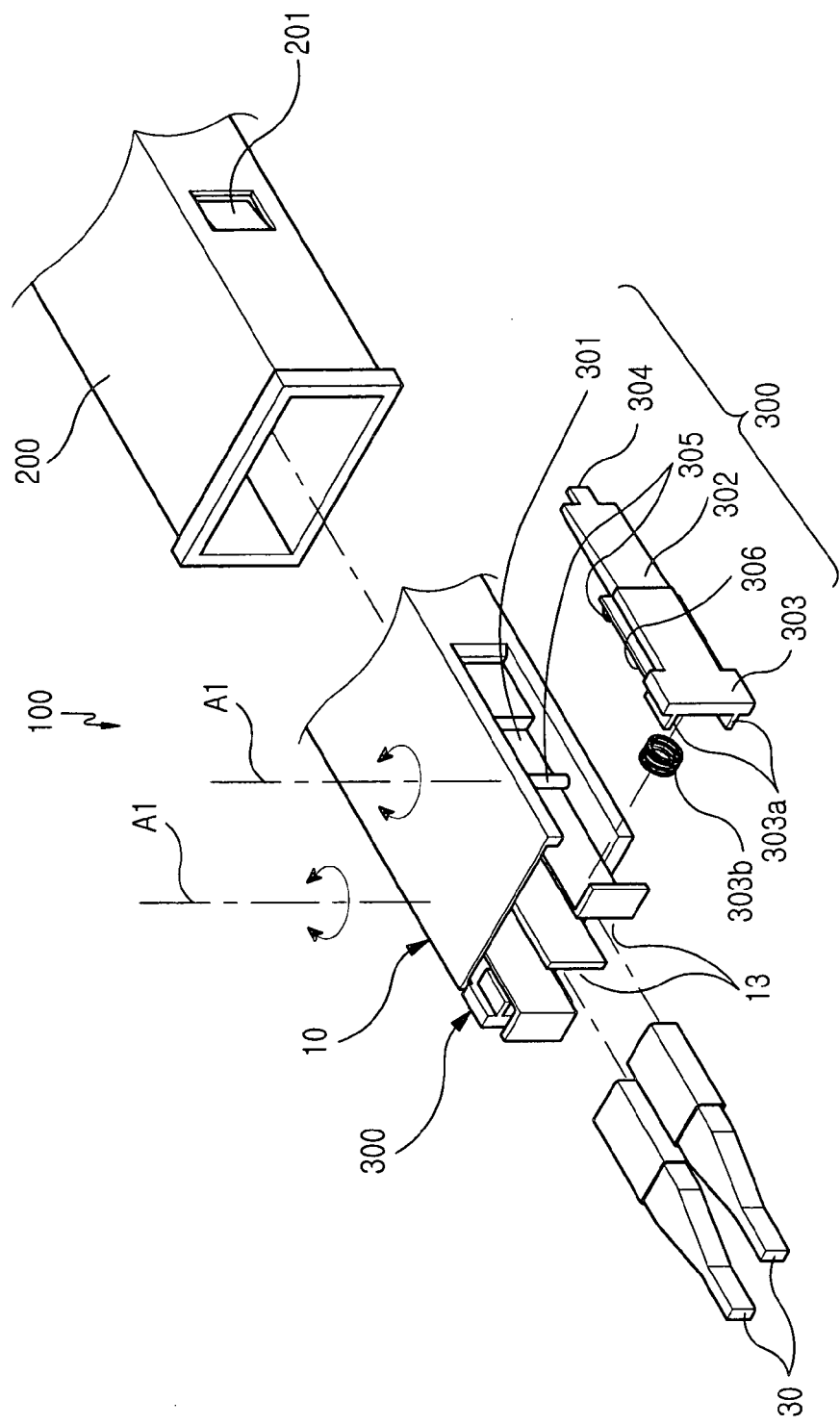
FIG. 7 is an exploded perspective view showing the construction of a fastening apparatus of a pluggable optical transceiver module according to a first embodiment of the present invention.

As shown in FIG. 7, the fastening apparatus 100 includes a module case 200 and at least one rotational latch apparatus 300.

Figure 8:
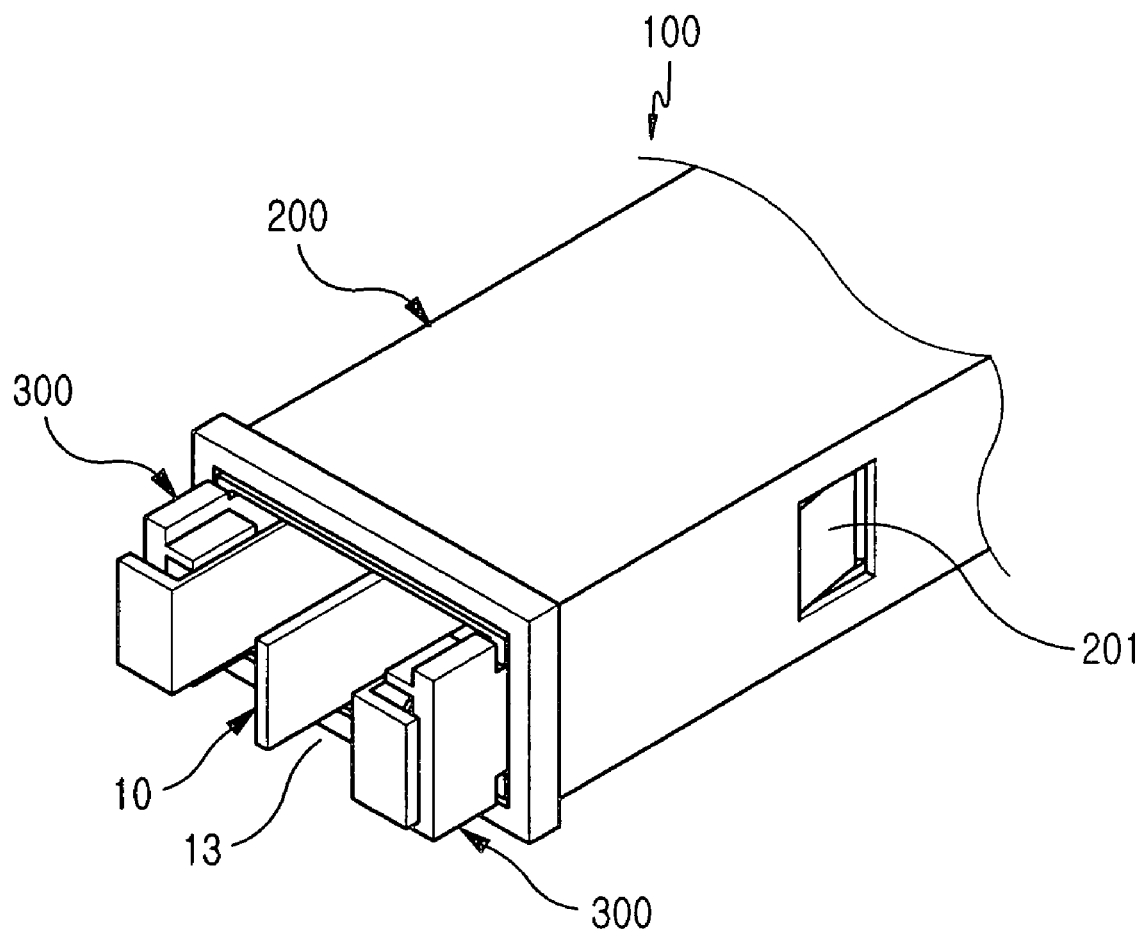
FIG. 8 is a perspective view showing a fastening apparatus of a pluggable optical transceiver module according to a first embodiment of the present invention, which is fastened on a module case.

As shown in FIGS. 7 and 8, an optical connector 30 is coupled to the module 10 and, in this state, the module 10 is mounted on the module case 200 for electrical connection.

Figure 9:
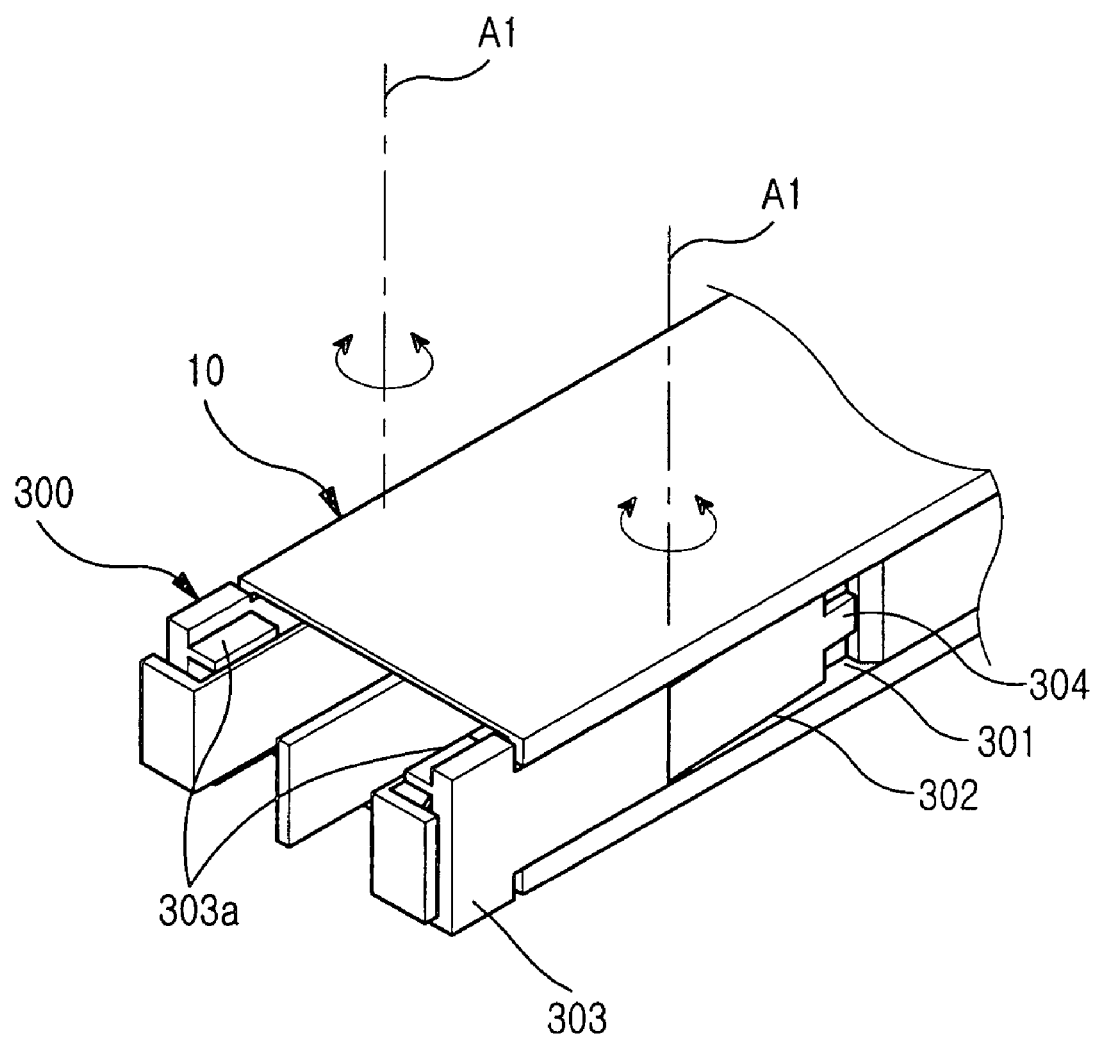
FIG. 9 is a perspective view showing a fastening apparatus of a pluggable optical transceiver module according to a first embodiment of the present invention, which is fastened on a module.
Figure 10:
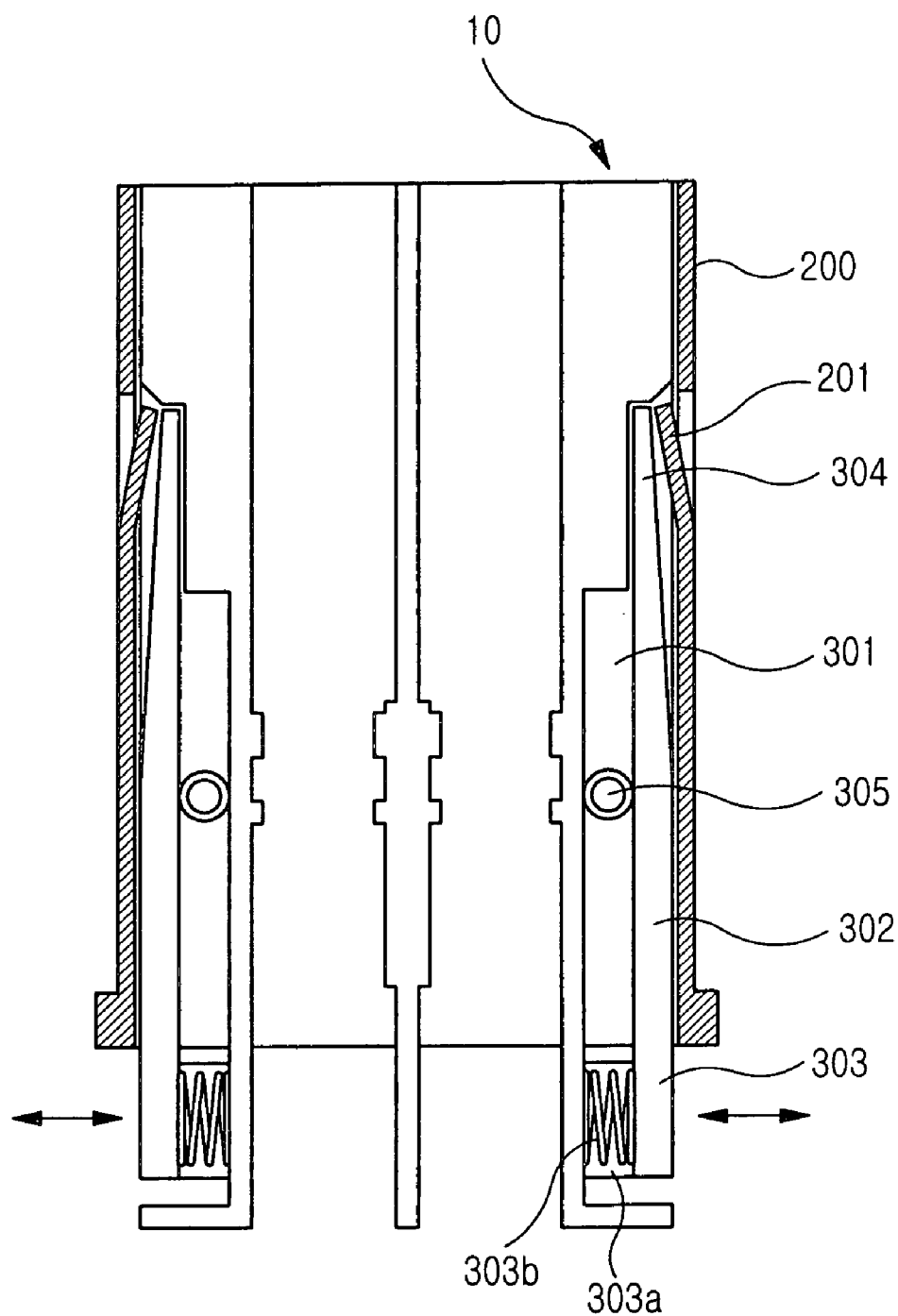
FIG. 10 is a side sectional view showing a fastening apparatus of a pluggable optical transceiver module according to a first embodiment of the present invention, before it is operated.

As shown in FIGS. 9 and 10, the module 10 has the rotational latch apparatus 300 positioned on both longitudinal lateral surfaces of the module 10. The rotational latch apparatus 300 is adapted to be latched on at least one latching portion 201, which is formed on both lateral surfaces of the module case 200, and to be retained thereby.

As the module 10 is mounted along the longitudinal direction of the module case 200, the optical connector 30 is electrically connected to the module case 200.

As shown in FIG. 10, the latching portion 201 may be made of a plate spring, which is bent a predetermined angle toward the interior of the module case 200.

The plate spring causes the rotation plate 302 of the rotational latch apparatus 300 to be latched and retained.

As shown in FIG. 10, the latching portion 201 is latched on a rotation locker portion 304, which is formed on the rotation plate 302.

The rotation plate 302 is positioned in an opening 301, which is formed on both lateral surfaces of the module.

Figure 11:
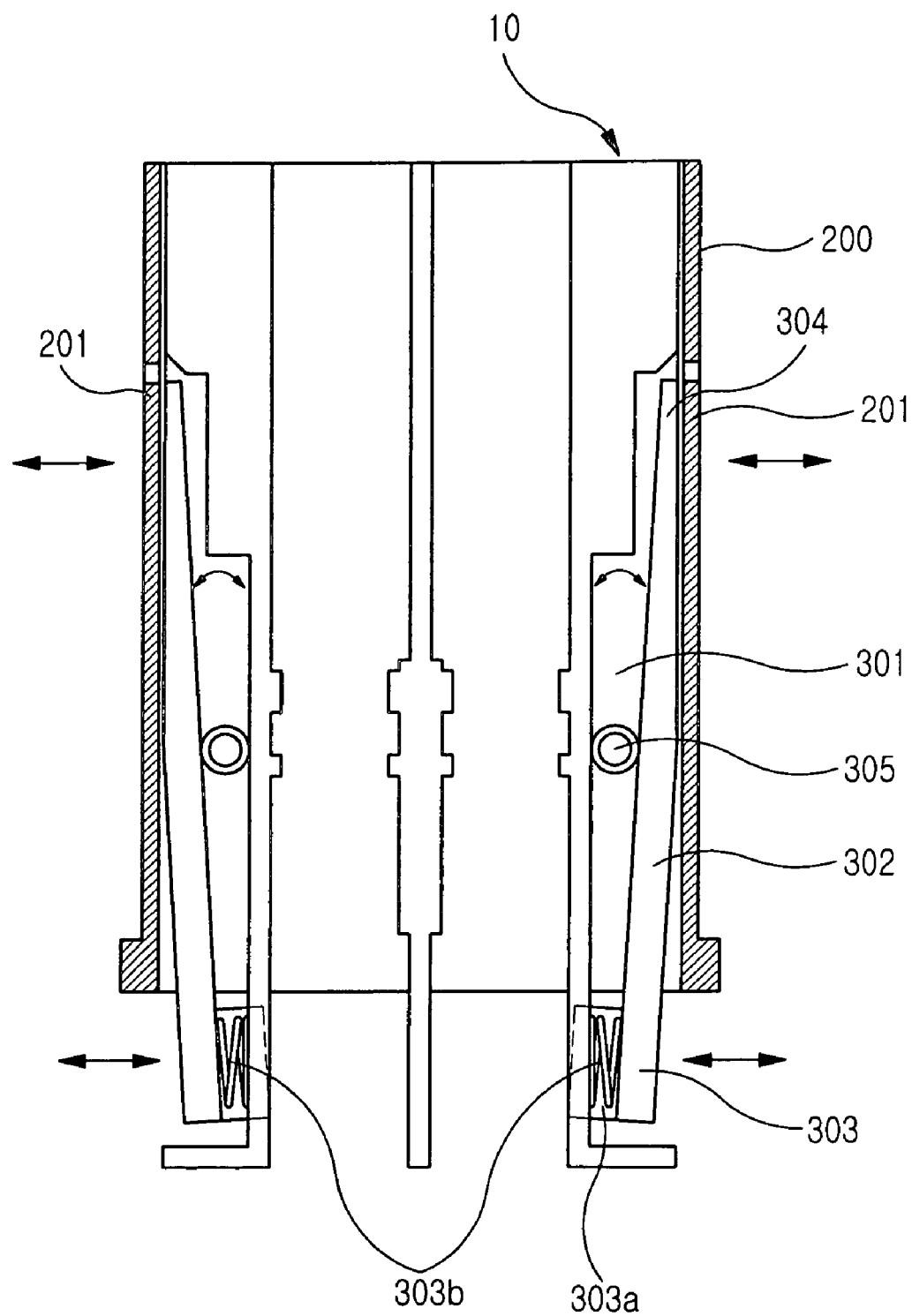
FIG. 11 is a side sectional view showing the operation of a latch apparatus, among the construction of a fastening apparatus of a pluggable optical transceiver module according to a first embodiment of the present invention.

When the module is to be unmounted in a state when the optical connector 30 is connected to the module 10, as shown in FIG. 11, a push button 303 of the rotation plate 302, which is provided on the rotational latch apparatus 300, is pressed along a direction perpendicular to the longitudinal direction of the module 10.

As shown in FIGS. 10 and 11, the rotation plate 302 has a rotation hinge portion 305 formed therein at a predetermined location. The rotation hinge portion 305 is coupled to the module 10 and provides the rotation axis A1. The rotation hinge portion 305 is adapted to be rotated to allow the rotation plate 302 to seesaw when the push button 303 is pressed. As such, the rotation plate 302 can be rotated about the rotation axis A1 and seesaw by means of the rotation hinge portion 305.

Figure 12:
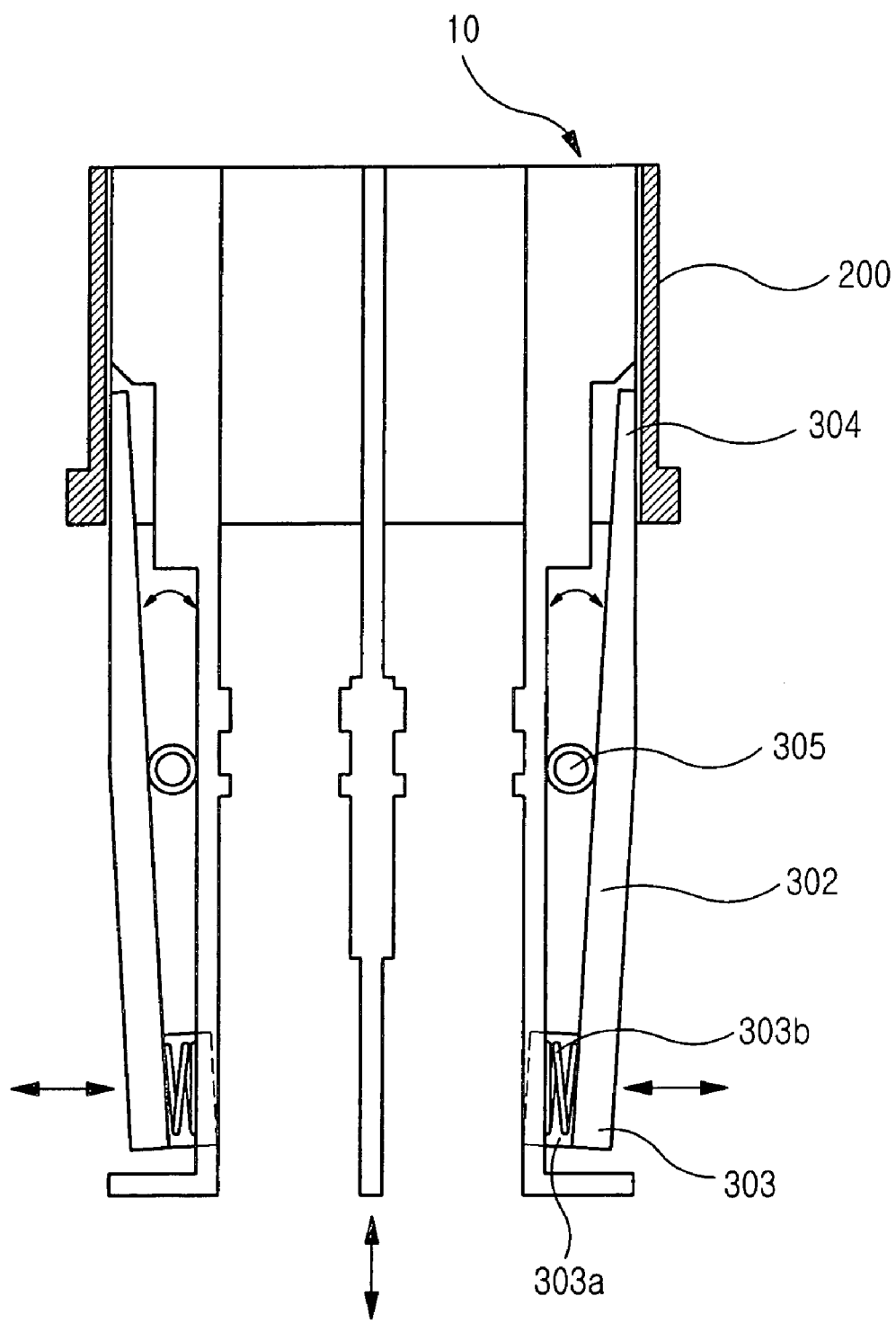
FIG. 12 is a side sectional view showing a fastening apparatus of a pluggable optical transceiver module according to a first embodiment of the present invention, which is separated from a module case.

As shown in FIG. 12, the rotation plate 302 has a rotation locker portion 304 formed on the other end thereof, which is adapted to seesaw when rotated and to stretch the bent latching portion 201 in a straight line by means of an elastic force. The module 10 is then unmounted from the module case 200.

As shown in FIGS. 11 and 12, the rotation plate 302 has an external surface which is slanted toward the interior of the module 10 along the longitudinal direction of the rotation plate 302. If the rotation plate 302 is rotated and seesaws, the slanted external surface thereof is positioned parallel to the longitudinal direction. The bent latching portion 201 is then stretched toward the exterior of the module case 200.

In this state, the push button 303 of the rotation plate 302 is grasped and separated from the module case 200, as shown in FIG. 12.

Once the module 10 is separated and unmounted from the module case 200, the push button 303 of the rotation plate 302 is released as shown in FIG. 12. The rotation plate 302 then seesaws and returns to original position by means of the elastic force from an elastic means 303b, which is positioned in the rotation plate 302.

The rotation plate 302 has at least one guide protrusion 303a formed therein, which guides the rotation plate 302 during rotation.

The elastic means 303b may be made of an elastic coil spring and a rubber member.

The operation of a fastening apparatus of a pluggable optical transceiver according to a second preferred embodiment of the present invention will now be described in more detail with reference to FIGS. 13 to 18.

Figure 13:
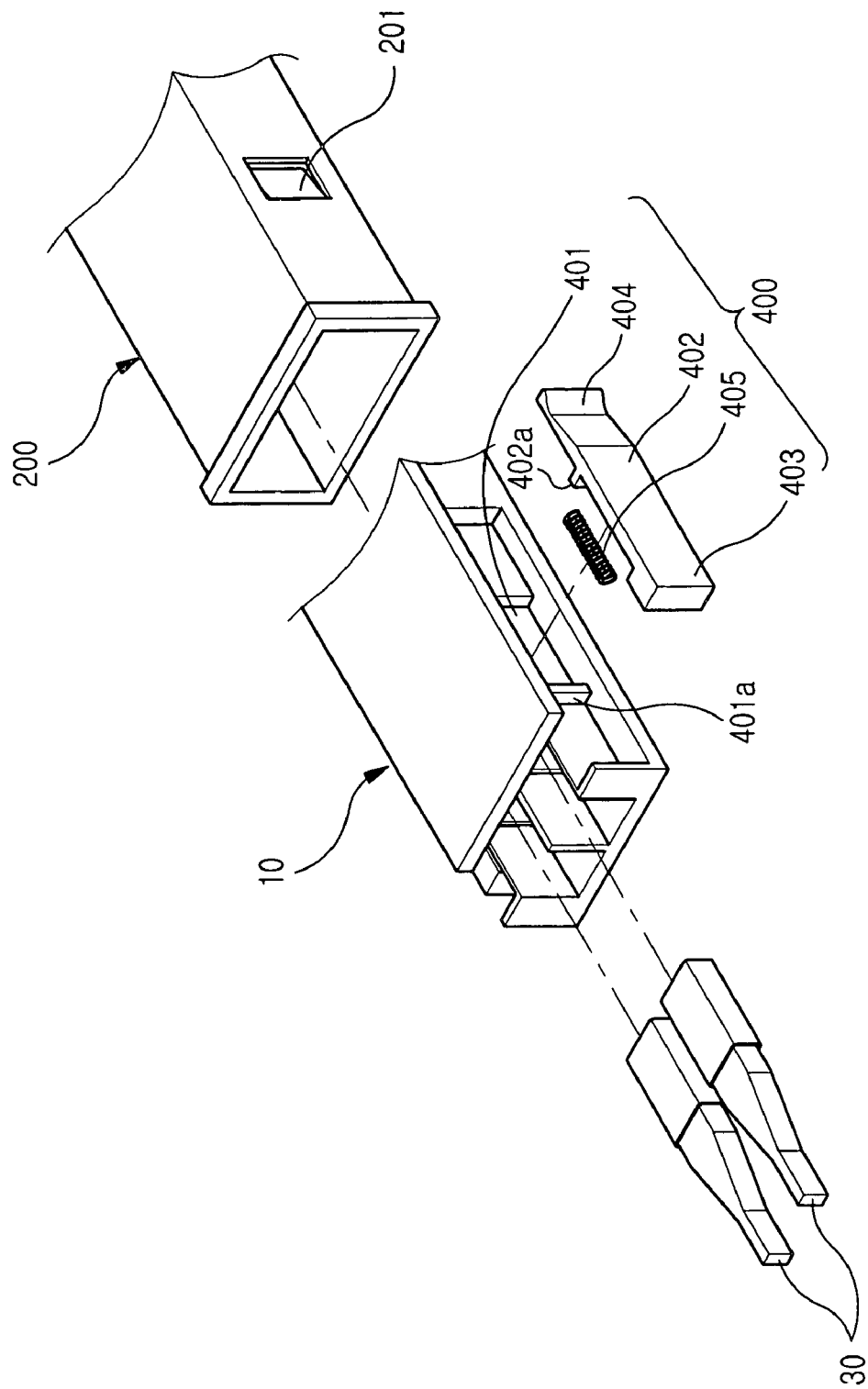
FIG. 13 is an exploded perspective view showing the construction of a fastening apparatus of a pluggable optical transceiver module according to a second embodiment of the present invention.

As shown in FIG. 13, the fastening apparatus 100 of a pluggable optical transceiver module includes a module case 200 and at least one movable latch apparatus 400.

Figure 14:
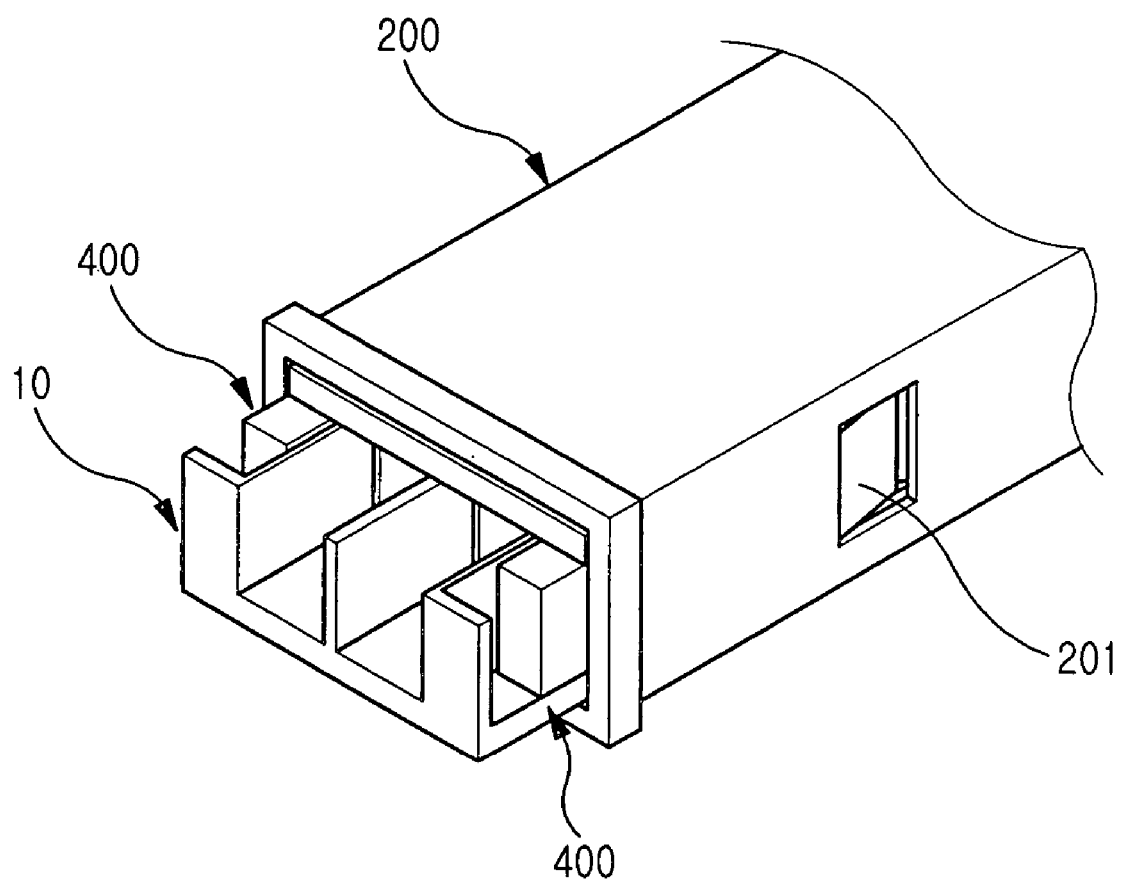
FIG. 14 is a perspective view showing a fastening apparatus of a pluggable optical transceiver module according to a second embodiment of the present invention, which is fastened on a module case.

As shown in FIGS. 13 and 14, an optical connector 30 is coupled to the module 10. In this state, the module 10 is mounted on the module case 200 for electrical connection.

Figure 15:
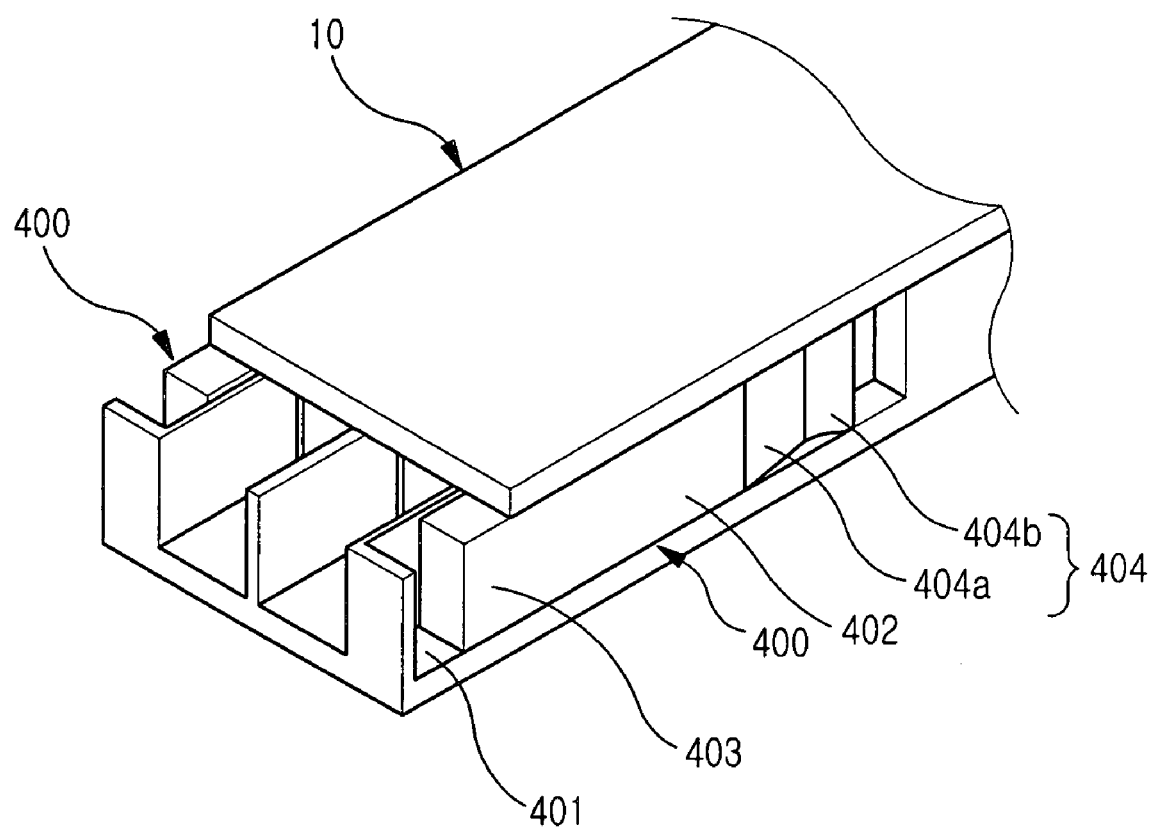
FIG. 15 is a perspective view showing a fastening apparatus of a pluggable optical transceiver module according to a second embodiment of the present invention, which is fastened on a module.
Figure 16:
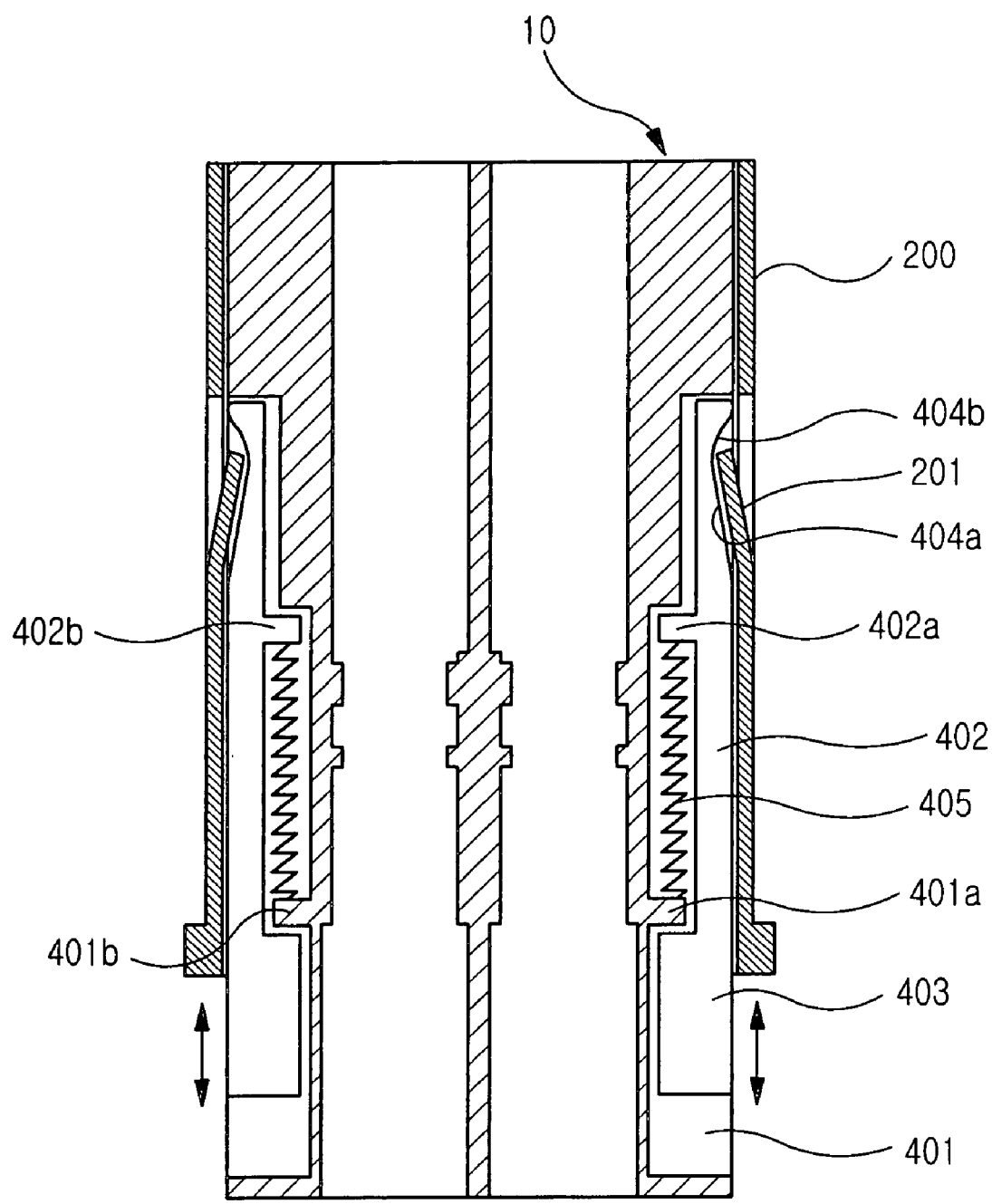
FIG. 16 is a side sectional view showing a fastening apparatus of a pluggable optical transceiver module according to a second embodiment of the present invention, before it is operated.

As shown in FIGS. 15 and 16, the movable latch apparatus 400 is positioned on both longitudinal lateral surfaces of the module 10. The movable latch apparatus 400 is adapted to be latched on at least one latching portion 201, which is formed on both lateral surfaces of the module case 200, and to be retained thereby.

As the module 10 is mounted along the longitudinal direction of the module case 200, the optical connector 30 is electrically connected to the module case 200.

As shown in FIG. 16, the latching portion 201 may be made of a plate spring, which is bent a predetermined angle toward the interior of the module case 200.

The plate spring causes the movement plate 402 to be latched and retained.

As shown in FIG. 16, the latching portion 201 is latched on a movement locker portion 404, which is formed on the movement plate 402.

Figure 17:
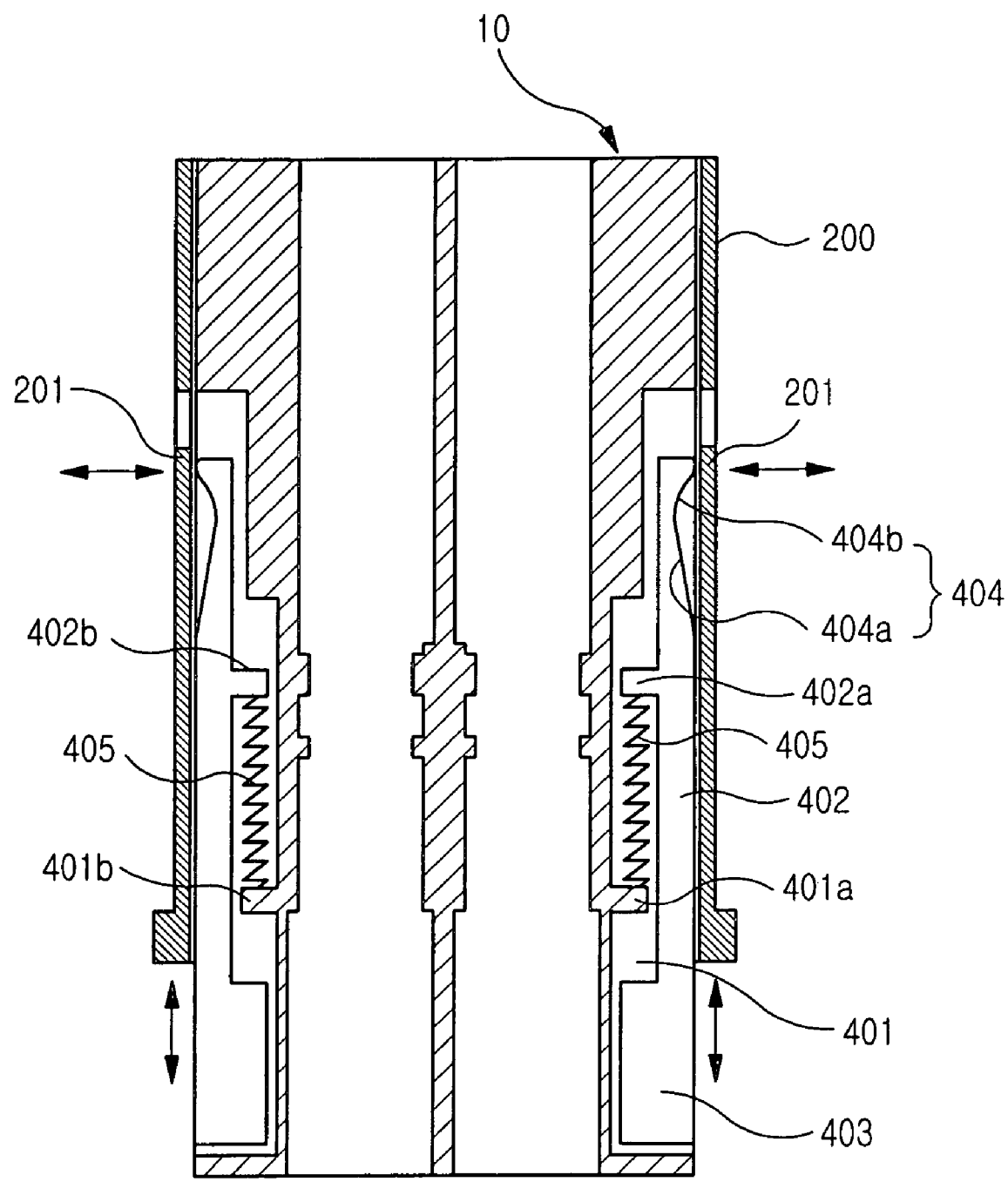
FIG. 17 is a side sectional view showing the operation of a latch apparatus, among the construction of a fastening apparatus for a pluggable optical transceiver module according to a second embodiment of the present invention.

The movement locker portion 404 has a slant surface 404a formed on a side thereof so that the latching portion 201 can be inserted easily, as shown in FIGS. 16 and 17. As the module 10 is mounted into the module case 200, the latching portion 201 is inserted along the slant surface 404a of the movement locker portion 404 and is retained thereby.

The movement plate 402 is positioned in an opening 401, which is formed on both lateral surfaces of the module 10.

Figure 18:
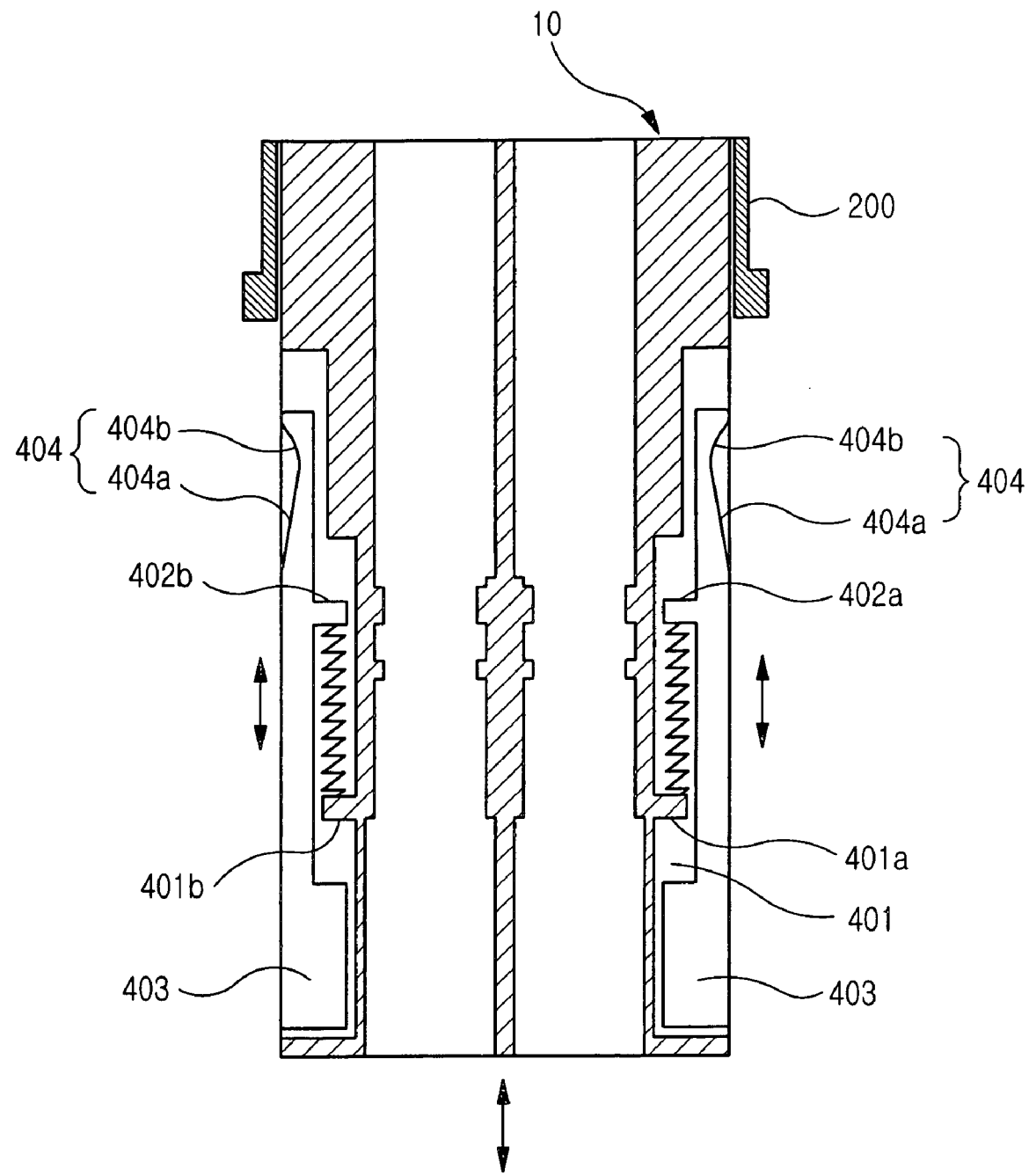
FIG. 18 is a side sectional view showing a fastening apparatus of a pluggable optical transceiver module according to a second embodiment of the present invention, which is separated from a module case.

When the module 10 is to be unmounted in a state when the optical connector 30 is connected to the module 10, as shown in FIGS. 17 and 18, the movement button 403 of the movement plate 402, which is provided on the movable latch apparatus 400, is pressed and the movement plate 402 is pulled along the longitudinal direction.

As shown in FIG. 18, a locker portion 404, which is formed on the movement plate 402, is then released from the latching portion 201 to allow the module 10 to slide.

The movement locker portion 404 has a curved surface 404b formed on the other side thereof so that the latching portion 201 can be released, as shown in FIG. 18. As the movement plate 402 is pulled, the latching portion 201 is stretched in a straight line along the longitudinal direction of the latching portion 201, while being guided by the curved surface 404b of the movement locker portion 404. The movement plate 402 is slid along the longitudinal direction of the module 10 to unmount the module 10 from the module case 200.

Once the module 10 is separated and unmounted from the module case 200, the movement button 403 of the movement plate 402 is released as shown in FIGS. 17 and 18. The movement plate 402 is then slid along the longitudinal direction and returns to original position by means of the elastic force from an elastic means 405, which is positioned in the movement plate 402.

The module has a first stopper protrusion 401a formed in its opening 401, as shown in FIG. 16 to 18, which is adapted to stop the sliding of the movement plate 402 and/or support the elastic means 405, upon contacting a first engagement step 401a formed in the movement plate 402.

The movement plate 402 has a second stopper protrusion 401b formed therein, which is adapted to support the elastic means 405, upon contacting a second engagement step 402b formed in the opening 401 of the module.

The elastic means 405 may be made of an elastic coil spring and a rubber member.

While the invention has been shown and described with reference to certain embodiments thereof, it will be understood by those skilled in the art that various changes in form and details may be made therein without departing from the spirit and scope of the invention as defined by the appended claims.

What is claimed is:

1. A fastening apparatus for a pluggable optical transceiver module that is coupled to an optical connector module case, the fastening apparatus comprising:
   a module case extending along a longitudinal direction and having at least one latching portion formed on both lateral surfaces thereof, the latching portion made of a plate spring that is bent at a predetermined angle toward interior of both lateral surfaces of the module case and adapted to latch on or release the rotational latch apparatus as it seesaws; and
   at least one rotational latch apparatus positioned on both longitudinal lateral surfaces of the module and adapted to be latched for mounting the module along the longitudinal direction of the module case, wherein the module may be released by applying the rotational latch apparatus a seesawing motion about a rotation axis, which is provided in an interior thereof, while pressing in a direction perpendicular to the longitudinal direction.

2. The fastening apparatus as claimed in claim 1, wherein the rotational latch apparatus is adapted for mounting and unmounting the module while the optical connector and the module are connected to each other.

3. The fastening apparatus as claimed in claim 1, wherein the rotational latch apparatus comprises:
   a rotation plate positioned in an opening formed on both lateral surfaces of the module and adapted to be rotated about the rotation axis and to seesaw, when pressed in a direction perpendicular to the longitudinal direction.

4. The fastening apparatus as claimed in claim 3, wherein the rotation plate has an external surface formed along the longitudinal direction thereof and slanted toward the interior of the module.

5. The fastening apparatus as claimed in claim 3, wherein the push button has at least one guide protrusion formed therein to guide the rotation plate when it is rotated, and an elastic means is positioned between the guide protrusion and the module to provide an elastic force so that the rotation plate can seesaw when it is rotated by pressing the push button.

6. The fastening apparatus as claimed in claim 5, wherein the elastic means is made of a coil spring and a rubber member.

7. The fastening apparatus as claimed in claim 3, wherein the rotation plate has at least one support plate formed on each of the upper and lower portions thereof along its longitudinal direction to contact an engagement step, which is formed in the opening, and support the rotation plate.

8. The fastening apparatus as claimed in claim 3, wherein the rotation hinge portion has a cylindrical shape.

9. The fastening apparatus as claimed in claim 3, wherein, when the module is to be mounted on the module case, the rotation locker portion of the rotation plate is latched on the latching portion, which is bent toward the interior of the module case, to mount and retain the module and, when the module is to be unmounted from the module case, the rotation locker portion is rotated by pressing the push button of the rotation plate and the bent latching portion is pushed toward the exterior of the case and stretched in the longitudinal direction to separate the module,
   a push button formed on an end of the rotation plate and adapted to be pressed in a direction perpendicular to the longitudinal direction of the plate by an external force;
   a rotation locker portion formed on the other end of the rotation plate and adapted to be latched on or released from the latching portion, as the rotation plate seesaws; and
   a rotation hinge portion formed in the rotation plate at a predetermined location, the rotation hinge portion being coupled to the module, providing the rotation axis, and being adapted to be rotated in such a manner that the rotation plate can seesaw.

10. The fastening apparatus as claimed in claim 1, wherein, when the module is to be mounted on the module case, the rotation locker portion of the rotation plate is latched on the latching portion, which is bent toward the interior of the module case, to mount and retain the module and, when the module is to be unmounted from the module case, the rotation locker portion is rotated by pressing the push button of the rotation plate and the bent latching portion is pushed toward the exterior of the case and stretched in the longitudinal direction to separate the module.

11. A fastening apparatus of a pluggable optical transceiver module which is coupled to an optical connector module case, the fastening apparatus comprising:
   a module case extending along a longitudinal direction;
   at least one movable latch apparatus positioned on both longitudinal lateral surfaces of the module and adapted to be latched for mounting the module along the longitudinal direction of the case, the movable latch apparatus comprising, a movement plate positioned in an opening formed on both lateral surfaces of the module and adapted to slide along the longitudinal direction of the module;

a movement button formed on an end of the movement plate;

a movement locker portion formed on the other end of the movement plate and adapted to be latched on or released from the latching portion; and an elastic means positioned in the movement plate to provide an elastic force so that the movement plate can slide, wherein the module can be released through a sliding motion, when the movable latch apparatus is pulled in the longitudinal direction away from the module case.

12. The fastening apparatus as claimed in claim 11, wherein the movable latch apparatus is adapted for mounting and unmounting the module while the optical connector and the module are connected to each other.

13. The fastening apparatus as claimed in claim 11, wherein the sliding motion of the movable latch apparatus is linear.

14. The fastening apparatus as claimed in claim 13, wherein, when the module is to be mounted on the module case, the latching portion, which is bent toward the interior of the module case, is coupled to a slant surface, which is formed on a side of the movement locker portion, to mount the module and, when the module is to be unmounted from the module case, the bent latching portion is pushed toward the exterior of the case, as the movement plate is pulled, and stretched in a straight line along the longitudinal direction by a curved surface, which is formed on the other side of the movement locker portion, to separate the module.

15. The fastening apparatus as claimed in claim 11, wherein the movement locker portion has a slant surface formed on a side thereof so that the latching portion can be inserted easily and a curved surface formed on the other side thereof so that the latching portion can be released easily.

16. The fastening apparatus as claimed in claim 11, wherein the module has a first stopper protrusion formed in its opening, which is adapted to stop the sliding of the movement plate or support the elastic means upon contacting a first engagement step formed in the movement plate, and the movement plate has a second stopper protrusion formed therein, which is adapted to support the elastic means upon contacting a second engagement step formed in the opening of the module.

17. The fastening apparatus as claimed in claim 11, wherein the elastic means is made of a coil spring and a rubber member.

18. The fastening apparatus as claimed in claim 11, wherein, when the module is to be mounted on the module case, the latching portion, which is bent toward the interior of the module case, is coupled to a slant surface, which is formed on a side of the movement locker portion, to mount the module and, when the module is to be unmounted from the module case, the bent latching portion is pushed toward the exterior of the case, as the movement plate is pulled, and stretched in a straight line along the longitudinal direction by a curved surface, which is formed on the other side of the movement locker portion, to separate the module.

* * * * *